Nov. 4, 1941.     O. EISENSCHMID     2,261,676
VOLTAGE REGULATOR
Filed Nov. 16, 1938
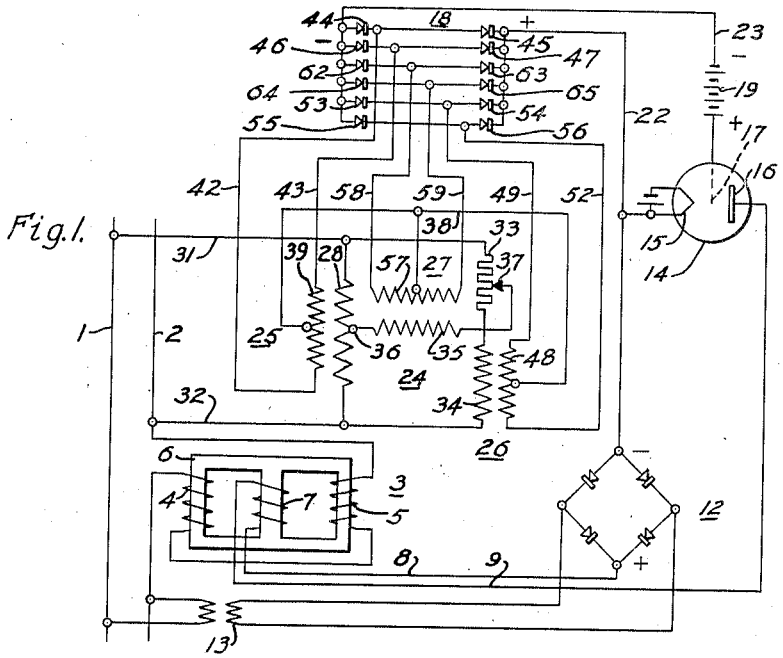
Fig.1.
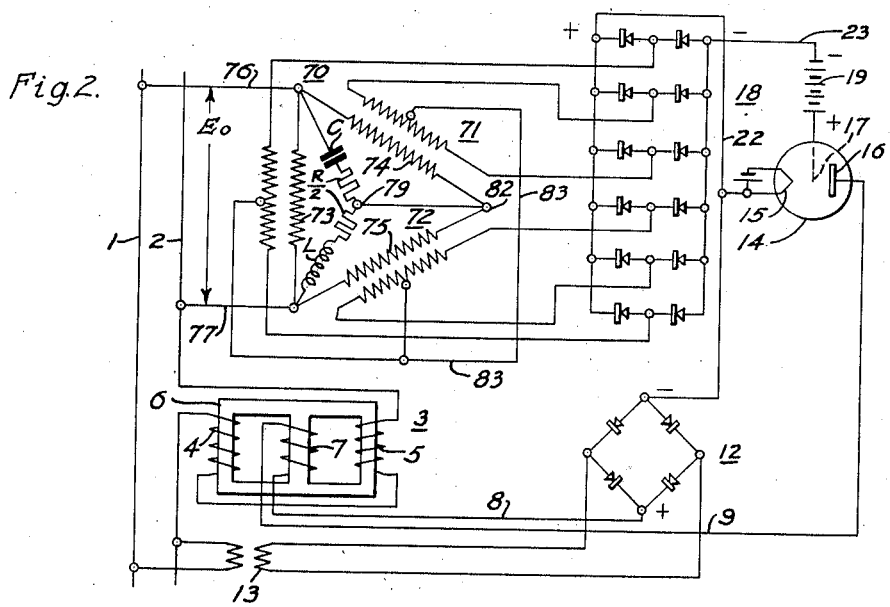
Fig.2.
Fig.3.
WITNESSES:
INVENTOR
Otto Eisenschmid.
BY
Franklin E. Hardy
ATTORNEY Patented Nov. 4, 1941

2,261,676

UNITED STATES PATENT OFFICE 2,261,676

VOLTAGE REGULATOR

Otto Eisenschmid, Berlin-Siemensstadt, Germany, assignor to Westinghouse Electric & Manufacturing Company, East Pittsburgh, Pa., a corporation of Pennsylvania Application November 16, 1938, Serial No. 240,673
In Germany December 4, 1937

3 Claims. (Cl. 175—363)

The invention relates to an automatic regulator for alternating current circuits that is particularly adapted for maintaining the voltage of the alternating current circuit constant.

Regulating mechanisms are well known in which the corrective impulse is obtained from the joint influence of two unidirectional sources, one of constant value and the other having a value that is a measure of the voltage of the circuit being regulated. Dry type rectifiers, such as the copper oxide rectifiers, may be employed to provide a unidirectional voltage that is a measure of the alternating voltage of the circuit being regulated. In such regulating systems, provision must be made that the unidirectional voltage derived from the alternating voltage by rectification is substantially constant. In order to eliminate the alternating component or wavy characteristic of the output voltage from the rectifier, a smoothing device or filter is frequently provided on the direct current side of the rectifier which consists of the combination of inductors, resistors and capacitors. Such devices are particularly necessary in regulating a single phase circuit. By the use of such a filter for smoothing out the alternating current ripple from the rectified voltage, the superimposed alternating component may be made negligibly small. However, these filtering devices introduce undesirable effects into the regulator operation as a result of the inductors and capacitors associated therewith, in that a comparatively large time delay exists between variations in the value of the alternating voltage being regulated and the corresponding variation in the voltage that initiates the corrective action. If, therefore, the voltage of the alternating circuit that it is desired to maintain constant, rises above or falls below its desired value, a certain time interval elapses before a corrective impulse becomes effective. It will be apparent that this undesirable characteristic is of greater importance, the greater the accuracy of regulation required. The effect of the filter causes the time delay of the regulator to increase as the load on the filter increases.

An object of this invention is to provide regulating mechanism in which the corrective impulses are promptly initiated, thus overcoming the above-described disadvantages.

In accordance with the invention, an auxiliary circuit or network is provided between the alternating current circuit being regulated and the rectifying unit that develops the unidirectional voltage that is a measure of the voltage of the alternating current circuit. This auxiliary circuit consists of a plurality of impedance devices so connected between the alternating current circuit to be regulated and the several elements of the rectifier unit, that a plurality of alternating voltages are developed that are displaced in phase angle with respect to each other. In accordance with the invention, the unidirectional voltage obtained by this means may be employed as in known regulating devices to initiate corrective impulses for effecting the correction in the regulated voltage of the alternating current circuit in the same manner as when filters are used in the rectified circuit. However, the regulating equipment, according to the invention, differs from known regulating mechanisms provided with filtering devices, in that the time delays occasioned by such filtering devices are completely avoided. The unidirectional voltage which is obtained through the rectifier unit as a measure of the voltage of the alternating current circuit being regulated, is promptly available for producing a regulating impulse for correcting the error in the regulating circuit.

In the drawing, Figure 1 is a diagrammatic view of apparatus and circuits illustrating one embodiment of the invention;

Fig. 2 is a diagram of apparatus and circuits illustrating another embodiment of the invention; and, Fig. 3 is a vector diagram of the voltages in the primary circuit in Fig. 2.

Referring to Fig. 1, circuit conductors 1 and 2 represent the alternating current circuit being regulated, the load or output voltage of which may be regulated by any one of a number of known devices such as the illustrated reactor 3 having windings 4 and 5 in series with the conductor 2 about the two outer legs of a core structure 6. The central leg of the core structure 6 is provided with a saturating winding 7 supplied with direct current through conductors 8 and 9, supplied from a rectifier unit 12, the alternating current side of which is connected through a transformer 13 to the alternating current source. Current flowing from the rectifier 12 to the saturating winding 7 is governed by a grid-controlled discharge tube 14 having a cathode 15, an anode 16, and a grid 17. A six-phase rectifier unit 18 is provided for supplying unidirectional current at a voltage that is a measure of the alternating voltage of the circuit 1, 2. The grid voltage of the tube 14 is determined by the combined effects of the voltage of the source 18 and of a source 19, illustrated as a battery, having a constant potential. The cathode 15 of the tube 14 is connected to the control grid 17 through a circuit including conductor 22, rectifier unit 18, conductor 23 and battery 19, the two sources of direct current energy 18 and 19 being shown as differentially related in the circuit.

An auxiliary circuit or network consisting of three transformers 25, 26 and 27 is connected between the alternating current circuit conductors 1, 2 and the rectifier unit 18. The primary winding 28 of the transformer 25 is connected to alternating current conductors 1 and 2 by means of conductors 31 and 32. A series circuit between conductors 31 and 32 is provided, in parallel relation with the primary winding 28, including a resistor 33 and the primary winding 34 of transformer 26. The primary winding 35 of the transformer 27 is connected between a point 36 on the winding 28 and a point 37 on the series circuit above mentioned. The inductance of the transformer 26 and the resistance of the resistor 33 are so dimensioned that the voltage of the transformer 26 is displaced in phase from the voltage of the transformer 25 by approximately 60°. The points 36 and 37 between which the winding 35 is connected are so selected that the voltage of the transformer 27 varies approximately 60° from the phase position of the voltage of both the transformers 25 and 26. The mid points of the secondary windings of the three transformers 25, 26 and 27 are connected together by a conductor 38. The opposite ends of the secondary winding 39 of the transformer 25 are connected by means of conductors 42 and 43 to points between pairs of rectifier elements 44 and 45 and 46 and 47, respectively, comprising parts of the rectifier unit 18. Similarly, the opposite ends of the secondary winding 48 of transformer 26 are connected by conductors 49 and 52 to points between pairs of rectifier elements 53 and 54, and 55 and 56, respectively. Likewise, the secondary winding 57 of the transformer 27 is connected by means of conductors 58 and 59 to points between pairs of rectifier elements 62 and 63, and 64 and 65, respectively.

In the equipment illustrated in Fig. 1, if the voltage between circuit conductors 1 and 2 increases above its desired value, the corresponding output voltages of the three transformers 25, 26 and 27 correspondingly increase, thus increasing the output voltage of the six-phase rectifier unit 18 to vary the differential voltage between the rectifier unit 18 and the battery 19. The voltage on the grid 17 of the tube 14 is thus so varied as to decrease the flow of current through the tube 14 and thereby decrease the saturation of the reactor 3, thus increasing the effective reactance between the source and the load supplied through conductors 1 and 2 to correspondingly decrease the voltage between conductors 1 and 2. If the voltage between conductors 1 and 2 decreases below its desired value, the voltage output of the rectifier unit 18 will correspondingly decrease and the combined voltages of the sources 18 and 19 will so change the grid potential of the tube 14 as to cause its conductivity to increase, thus increasing the current supplied to winding 7 of the reactor 3 to increase the effective reactance in series with the conductor 2.

Referring to Fig. 2 of the drawing, another embodiment of the invention is illustrated that is similar to that illustrated in Fig. 1, excepting for the particular network connected between the alternating current circuit represented by conductors 1 and 2 and the rectifier unit 18. In the embodiment of Fig. 2, three transformers 70, 71, and 72 are provided, the primary windings 73, 74 and 75 of which are connected in delta relation to each other, and one of these windings, 73, is connected by conductors 76 and 77 across conductors 1 and 2 of the alternating current circuit being regulated. In shunt relation to the winding 73, a series circuit is provided consisting of a condenser C, a resistor $$\frac{R}{2}$$

to a mid point 79, a second resistor $$\frac{R}{2}$$

and an inductor L. The mid point 79 in this series circuit is connected to a point 82 which is the junction point between windings 74 and 75 so that the portion of this series circuit including the condenser is in parallel with the winding 74 and the portion of this series circuit including the inductor is in series with the winding 75. The vector relation of the voltages in the several parts of the network connected to conductors 1 and 2 is represented in Fig. 4, in which the vector $E_0$ represents the voltage impressed on the winding 73, the vectors $$E_L, \ E\frac{R}{2}, \ E\frac{R}{2}, \ \text{and} \ E_C$$

represent vectorially the voltages across the four parts of the above-traced series circuit and the vectors $E_{75}$ and $E_{74}$ represent the vectors across windings 75 and 74. It will be noted that the three vectors $E_0$, $E_{75}$ and $E_{74}$ form a triangle of vectors each of which is displaced by substantially 60° from the other two. The mid points of the secondary windings of the three transformers in Fig. 2 are connected together by conductor 83 in the same manner as in Fig. 1 and the opposite ends of each secondary winding are connected between two pairs of rectifier elements. As in Fig. 1, the several elements together constituting the source 18 develop a rectified voltage corresponding in value to the voltage of the alternating current circuit being regulated.

In order to obtain the 60° relation between the several vectors illustrated in Fig. 4, the various parts of the circuit are dimensioned in accordance with the following equation:

$$\sqrt{w^2L^2+\frac{R^2}{4}}=\sqrt{\frac{1}{w^2C^2}+\frac{R^2}{4}}=R$$

When the parts of the circuit are related in the manner indicated by the above formula in which $w=2\pi f$, $f$ being the frequency of the circuit in cycles per second, L the inductance of the inductor L in henries and C the capacity of the series capacitor in farads.

The employment of the network and circuit arrangements illustrated and described for developing a unidirectional potential that is a measure of the alternating potential of the circuit being regulated results in the application to the control grid of the tube of a corrective potential for effecting the desired regulation immediately upon a change in the voltage of the circuit being regulated, and overcomes the delay occasioned by the use of a filter in a unidirectional or rectified circuit, which filter may introduce a time delay as great as half a second after an alternating voltage changed before a full corrective influence is impressed upon the regulating element.

Modifications of the apparatus illustrated and described within the spirit of my invention will occur to those skilled in the art, and I do not wish to be limited otherwise than by the scope of the appended claims.

I claim as my invention:

1. In electrical apparatus for obtaining a smooth unidirectional current from an alternating current source of electrical energy, in combination, a single phase alternating current circuit, a plurality of full wave rectifier units, a network comprising a plurality of transformers connected between the alternating current circuit and the rectifier units for developing a plurality of multiphase alternating voltages for application to the several rectifier units, each transformer having a primary and a secondary winding, the primary windings of one transformer being connected directly across the conductors of the alternating current circuit, a series circuit connected across the conductors of the alternating current circuit including an ohmic resistor and the primary winding of a second transformer, the primary winding of a third transformer being connected between a point intermediate the ends of the primary winding of the first named transformer and a point in the above-named series circuit, the secondary windings of the three transformers being connected to the several rectifier units.

2. In electrical apparatus for obtaining a smooth unidirectional current from an alternating current source of electrical energy, in combination, a single phase alternating current circuit, a plurality of full wave rectifier units, a network connected between the alternating current circuit and the rectifier units for developing a plurality of multiphase alternating voltages for application to the several rectifier elements comprising three transformers having their primary windings connected in delta relation, one of said windings being connected across the conductors of the alternating current circuit, a series circuit in parallel relation to another of said windings having an inductance (L) and a resistance $$\left(\frac{R}{2}\right)$$

a circuit in parallel relation to the other of said windings having a capacitance (c) and resistance $$\left(\frac{R}{2}\right)$$

the value of inductance, capacitance and resistance being proportioned to meet the equation:

$$\sqrt{w^2L^2+\frac{R^2}{2}}=\sqrt{\frac{1}{w^2C^2}+\frac{R^2}{4}}=R$$

where $w=2\pi$ times the frequency of the alternating current circuit, the secondary windings of the three transformers being connected to supply the several rectifier units.

3. In electrical apparatus for obtaining a smooth unidirectional current from an alternating current source of electrical energy, in combination, a single phase alternating current circuit, a plurality of full wave rectifier units, a network connected between the alternating current circuit and the rectifier units for developing a plurality of multiphase alternating voltages for application to the several rectifier units comprising three transformers having their primary windings connected in delta relation, one of said windings being connected across the conductors of the alternating current circuit, a series circuit in parallel relation to another of said windings having an inductance (L) and a resistance $$\left(\frac{R}{2}\right)$$

a circuit in parallel relation to the other of said windings having a capacitance (c) and resistance $$\left(\frac{R}{2}\right)$$

the secondary windings of the three transformers being connected to supply the several rectifier units.

OTTO EISENSCHMID.